3,261,687
ANIMAL FEED CONTAINING LINCOMYCIN AND SPECTINOMYCIN

Malcolm E. Bergy and Ross R. Herr, Kalamazoo, and Donald J. Mason, Portage, Mich., assignors to The Upjohn Company, Kalamazoo, Mich., a corporation of Delaware
No Drawing. Filed Sept. 21, 1964, Ser. No. 398,060
6 Claims. (Cl. 99—2)

This application is a continuation-in-part of application Serial No. 134,843, filed August 30, 1961, now U.S. Patent 3,155,580.

This invention relates to compositions and methods for animal husbandry and more particularly to animal feed compositions containing lincomycin and spectinomycin and a method for obtaining increased productivity in meat-producing animals.

It has been found in recent years that meat-producing animals will gain more weight and gain it faster when various classes of compounds such as vitamins, minerals, estrogens, antibiotics, and tranquilizers are added to the diet. Although the presently available compounds are useful, new materials are still being sought that would produce weight gains more rapidly, to a greater extent, more efficiently with respect to feed intake at a lower cost and without undesirable side effects.

Broadly, the present invention encompasses a nutritionally adequate animal feed having dispersed therein a combination of antibiotics, said combination comprising lincomycin and spectinomycin. The invention also includes the process of feeding the composition to meat-producing animals.

It is now possible by use of the present invention to obtain unexpected results in the feeding of meat-producing animals. That is to say, the results achieved by use of the antibiotic combination in association with an animal feed are greater than can be achieved by use of any single member and are greater in effect than could be expected by the summation of the effects of the individual antibiotics. These unexpected results include an increased rate of weight gain, an increased amount of weight gain, and an increased feed efficiency. The foregoing results can be obtained in meat-producing animals such as cattle, swine, sheep, and poultry.

The antibiotics are added to the animals' nutritionally adequate feedstuff in a total amount of from 5 to 100 mg. per pound of feed. The antibiotics are present in a ratio of from 1 part to 10 parts of spectinomycin to 1 part of lincomycin. Preferred is 3 parts of spectinomycin to 1 part of lincomycin.

The term "lincomycin" as used herein shall be taken to mean lincomycin free base and the pharmacologically acceptable acid addition salts thereof. The free base and salts thereof can be prepared as described in U.S. Patent 3,086,912.

As used in the specification and claims the term spectinomycin shall be taken to mean spectinomycin free base and the pharmacologically acceptable acid addition salts thereof.

Spectinomycin is a non-proprietary name adopted by the American Medical Association United States Pharmacopeia Nomenclature Committee of J.A.M.A., vol. 182, No. 7, p. 733 (November 17, 1962). The antibiotic is also referred to in the literature as actinospectacin.

Spectinomycin and the salts thereof can be prepared as described in South African Patent No. 60/4,098; Belgian Patent No. 596,175; and U.S. application No. 847,092, filed October 20, 1959, wherein in said references, spectinomycin is called actinospectacin.

Unless otherwise specified, all percentages are given on a weight-to-weight basis. The pound (lb.) weights given are avoirdupois units.

Advantageously, the antibiotics are supplied in the form of a liquid or solid premix wherein the antibiotic concentration is 100 to 2000 times greater than the desired antibiotic concentration in the feed. For example, the antibiotics can be dissolved or suspended in a fluid vehicle such as corn oil, cottonseed oil, molasses, distillers solubles and the like to prepare a fluid premix. Alternatively, a solid premix can be prepared by mixing the antibiotics with an edible solid diluent such as sucrose, lactose, starch, corn meal, flour, calcium carbonate, soybean meal and the like.

Feeding of the compositions of the present invention can commence for birds shortly after hatching and in the case of mammals, during the creep-feeding period of suckling animals when they are starting on solid food and, of course, after weaning. Feeding of the compositions is continued throughout the growing period.

The total concentration of lincomycin and spectinomycin in the feed composition is determined with regard to the species of animal, age, weight, and average amount of feed consumed daily. The following table illustrates the range of combined lincomyin and spectinomycin in grams per ton of feed for representative animals.

| Animal | Range (gram/ton) | Preferred amount (gram/ton) |
|---|---|---|
| Swine (birth to 8 weeks) | 15 to 200 | 75 |
| Swine (40–100 lb.) | 10 to 200 | 50 |
| Chicken (0–12 weeks) | 4 to 100 | 10 |
| Turkeys (0–24 weeks) | 4 to 100 | 10 |
| Beef cattle (fattening) | 4 to 100 | 8 |
| Calves (0–12 weeks) | 10 to 200 | 50 |
| Lambs | 5 to 100 | 25 |

An additional embodiment of the process of the present invention is the administration of lincomycin and spectinomycin dispersed in the animals' drinking water as an alternative to the administration of spectinomycin in combination with the animals' feed.

For administration with drinking water, a premix is conveniently prepared comprising lincomycin and spectinomycin in combination with a solid, non-toxic, water-soluble diluent.

The concentration of the antibiotics in water is about ½ the concentration (weight to weight basis) of the antibiotic concentration in feed, or more conveniently expressed in grams/gallon. For example, in each 250 gallons of drinking water (about 1 ton) would be dissolved the following total amounts of the antibiotics: 7.5 to 100 grams for swine (to 8 weeks); 5 to 100 grams for swine (40–100 lb.) and calves; 2 to 50 grams for chickens, turkeys and cattle; and 2.5 to 50 grams for lambs.

The composition of the present invention, in form suitable for poultry feed, can be fed for chickens and other fowl as a therapeutic and prophylactic treatment for infections due to Pasteurella, Salmonella, Coliforms, Staphylococcus, and Streptococcus.

Similarly, in appropriate form for mammals, the feeds can be fed for therapeutic and prophylactic treatment in cattle, swine and sheep.

For increased production in meat-producing animals in an infectious diseased state the preferred concentration of antibiotics in the feed can be increased for the various species to the following levels: swine, birth to 8 weeks, 400 gm./ton; swine, 40–100 lb., 400 gm./ton; chicken, up to 12 weeks, 800 gm./ton; turkeys, up to 24 weeks, 800 gm./ton; beef cattle, fattening, 200 gm./ton; calves, up to 12 weeks, 400 gm./ton; and lambs, 200 gm./ton.

The animals feed containing the increased amounts of antibiotics are fed for a shorter time during the period when therapeutic treatment is required.

The following examples illustrate the best mode contemplated by the inventor for carrying out the invention but are not to be construed as limiting the scope thereof.

EXAMPLE 1

*Premix A*

| | Gm. |
|---|---|
| Lincomycin hydrochloride | .625 |
| Spectinomycin sulfate | 1.875 |
| Lactose, q.s. 1.0 lb. | |

*Premix B*

| | |
|---|---|
| Lincomycin hydrochloride | .1 |
| Spectinomycin sulfate | .3 |
| Calcium carbonate, q.s. 1.0 lb. | |

*Premix C*

| | |
|---|---|
| Lincomycin hydrochloride | .125 |
| Spectinomycin sulfate | .375 |
| Corn meal, q.s. 1.0 lb. | |

*Premix D*

| | |
|---|---|
| Lincomycin hydrochloride | .4 |
| Spectinomycin sulfate | .8 |
| Cottonseed oil, q.s. 1.0 lb. | |

*Premix E*

| | |
|---|---|
| Lincomycin hydrochloride | .1 |
| Spectinomycin sulfate | 1.0 |
| Sucrose, q.s. 1.0 lb. | |

*Premix F*

| | |
|---|---|
| Lincomycin hydrochloride | 1.0 |
| Spectinomycin sulfate | 5.0 |
| Oyster shell flour, q.s. 1.0 lb. | |

*Premix G*

| | |
|---|---|
| Lincomycin hydrochloride | .04 |
| Spectinomycin sulfate | .16 |
| Wheat flour, q.s. 1.0 lb. | |

*Premix H*

| | |
|---|---|
| Lincomycin hydrochloride | 1.0 |
| Spectinomycin sulfate | 1.0 |
| Corn oil, q.s. 1.0 lb. | |

The foregoing premix formulas are prepared using finely ground solid materials and mixing all ingredients together in an appropriate manner.

EXAMPLE 2

A swine growing diet for hogs of 40 to 100 pounds body weight is prepared from the following types and amounts of ingredients:

| | Percent |
|---|---|
| Corn, ground | 78.15 |
| Soybean oil meal, 44% | 17.0 |
| Meat and bone scraps, 50% | 3.0 |
| Oyster shell flour | 0.4 |
| Bonemeal | 0.5 |
| Sodium chloride | 0.5 |
| Trace mineral mixture [1] | 0.05 |
| Zinc oxide | 0.01 |
| Vitamin A and D supplement [2] | 0.22 |
| B vitamin supplement [3] | 0.04 |
| Vitamin $B_{12}$ supplement [4] | 0.08 |

[1] Contains the following percent of minerals: Mn, 12; Co, 0.08; Fe, 5.0; Cu, 0.4; I, 0.24; Zn, 0.7.
[2] Contains 300 U.S.P. units $D_3$/gm. and 1500 I.U. A/gm.
[3] Contains per lb.: riboflavin, 2000 mg.; calcium pantothenate, 4000 mg.; niacin, 9000 mg.; and choline chloride, 10,000 mg.
[4] Contains 6 mg. vitamin $B_{12}$ per lb.

To 99 parts of the preceding feed is added 1 part of Premix A to provide a feed with 25 mg. per lb. of antibiotics.

Substituting Premixes B through H, inclusive, feeds are prepared with varying amounts and ratios of antibiotics.

The foregoing composition is usefully fed to hogs for increased rate of weight gain and for improved feed efficiency.

EXAMPLE 3

A fattening feed for 800 pound yearling cattle is prepared from the following types and amounts of ingredients:

| | Percent |
|---|---|
| Ground ear corn | 89.75 |
| Soybean oil meal, 44% | 9.0 |
| Ground limestone | 0.7 |
| Sodium chloride | 0.5 |
| Trace mineral mixture [1] | 0.05 |

[1] Contains the following percent of minerals: Mn, 12; Co, 0.08; Fe, 5.0; Cu, 0.4; I, 0.24; Zn, 0.7.

To 99 parts of the preceding feed is added 1 part of Premix B to provide a feed with 4 mg. per lb. of antibiotics.

Substituting Premixes A through H, inclusive, feeds are prepared with varying amounts and ratios of antibiotics.

Cattle are to receive the foregoing feed ad libitum together with 5 lb. of hay per head per day for an increased rate of weight gain and increased feed efficiency.

EXAMPLE 4

A chicken feed for broilers is prepared from the following types and amounts of ingredients:

| | Percent |
|---|---|
| Yellow corn meal | 67.35 |
| Soybean oil meal, 50% | 24.00 |
| Menhaden fish meal, 60% | 6.00 |
| Steamed bonemeal | 1.00 |
| Ground limestone | 1.00 |
| Iodized salt | .34 |
| 25% choline chloride | .13 |
| Vitamin $B_{12}$ supplement (6 mg./lb.) | .10 |
| Manganese sulfate | .02 |
| Supplemental vitamin mix [1] | .06 |

[1] Consisting of 16.0 gm. vitamin A supplement (10,000 units/gm.); 3.6 gm. vitamin $D_3$ supplement (15,000 units/gm.); 7.1 gm. riboflavin supplement (1 gm. riboflavin per ounce); 500 mg. niacin.

To 99 parts of the preceding feed is added 1 part of Premix C to provide a feed with 5 mg. per lb. of antibiotic.

Substituting Premixes A through H, inclusive, feeds are prepared with varying amounts and ratios of antibiotics.

The foregoing composition is usefully fed to chickens for increased rate of weight gain and improved utilization of feed.

EXAMPLE 5

A diet for fattening lambs is prepared from the following types and amounts of ingredients:

| | Percent |
|---|---|
| Ground ear corn | 82.05 |
| Alfalfa meal | 10.0 |
| Soybean oil meal 44% | 7.0 |
| Ground limestone | 0.3 |
| Salt | 0.6 |
| Trade mineral mixture [1] | 0.05 |

[1] Contains the following percent of minerals: Mn, 12; Co, 0.08; Fe, 5.0; Cu, 0.4; I, 0.24; Zn, 0.7.

The above feed to be mixed, pelleted and offered to fattening lambs free-choice in conjunction with hay.

To 99 parts of the preceding feed is added 1 part of Premix D to provide a feed with 12 mg. per lb. of antibiotics.

Substituting Premixes A through H, inclusive, feeds are prepared with varying amounts and ratios of antibiotics.

EXAMPLE 6

A premix for addition to drinking water is prepared from the following types and amounts of ingredients:

| | Gm. |
|---|---|
| Lincomycin hydrochloride | 2 |
| Spectinomycin sulfate | 8 |
| Sucrose | 444 |

The lincomycin hydrochloride, spectinomycin sulfate, and sucrose are mixed together.

The premix is added to drinking water in the following amounts: chickens and turkeys ½ lb./250 gallons; beef cattle 1 lb./250 gallons; and swine (40 to 100 lbs.) 2 lb./250 gallons.

What is claimed is:

1. A process for obtaining increased production in healthy meat-producing animals comprising the feeding of from 1 to 10 parts by weight of spectinomycin to one part by weight of lincomycin in combination with an animal feed.

2. The process of claim 1 wherein the antibiotics are fed in a concentration of from 2 mg. to 100 mg. per pound of animal feed.

3. The process of claim 1 wherein the spectinomycin is spectinomycin sulfate and lincomycin is lincomycin hydrochloride.

4. An animal feed for increasing production in healthy meat-producing animals comprising from 1 to 10 parts by weight of spectinomycin to one part by weight of lincomycin in combination with an animal feed.

5. The composition of claim 4 wherein the antibiotics are present in a concentration of from 2 mg. to 100 mg. per pound of animal feed.

6. The composition of claim 4 wherein the spectinomycin is spectinomycin sulfate and lincomycin is lincomycin hydrochloride.

References Cited by the Examiner

UNITED STATES PATENTS

| 2,929,711 | 3/1960 | Stokstad et al. | 99—2 |
| 3,061,513 | 10/1962 | English et al. | 99—2 |
| 3,150,042 | 9/1964 | Bloss et al. | 99—2 |
| 3,155,580 | 11/1964 | Bergy et al. | 99—2 |

OTHER REFERENCES

Chemical Abstracts, vol 57, No. 6, 2087b, July 23, 1962.

Chemical Abstracts, vol. 58, No. 11, 11837f, May 27, 1963.

A. LOUIS MONACELL, *Primary Examiner.*

D. J. DONOVAN, *Assistant Examiner.*